United States Patent
Mizukoshi et al.

(10) Patent No.: US 10,857,921 B1
(45) Date of Patent: Dec. 8, 2020

(54) MAT ATTACHMENT STRUCTURE OF SEATBACK AND VEHICLE SEAT

(71) Applicants: Adient Engineering and IP GmbH, Burscheid (DE); HONDA MOTOR CO., LTD., Tokyo (JP)

(72) Inventors: Toshimitsu Mizukoshi, Saitama (JP); Masaki Shimazu, Saitama (JP); Taiji Misono, Saitama (JP); Hiroyuki Yasui, Kanagawa (JP); Motohiko Ozawa, Kanagawa (JP)

(73) Assignees: Adient Engineering and IP GmbH, Burscheid (DE); Honda Motor Co, Ltd., Tokyo (JP)

( * ) Notice: Subject to any disclaimer, the term of this patent is extended or adjusted under 35 U.S.C. 154(b) by 0 days.

(21) Appl. No.: 16/539,166

(22) Filed: Aug. 13, 2019

(51) Int. Cl.
*B60N 2/427* (2006.01)
*B60N 2/72* (2006.01)
*B60N 2/64* (2006.01)

(52) U.S. Cl.
CPC ...... *B60N 2/72* (2013.01); *B60N 2/64* (2013.01)

(58) Field of Classification Search
CPC . B60N 2/686; B60N 2/70; B60N 2/68; B60N 2/7094; B60N 2/72; B60N 2/5825; B60N 2/7011; B60N 2/4228; B60N 2/42745; B60N 2/66; B60N 2/682; B60N 2/42709; B60N 2/22
See application file for complete search history.

(56) References Cited

U.S. PATENT DOCUMENTS

| | | | | |
|---|---|---|---|---|
| 7,677,659 | B2 * | 3/2010 | Humer | B60N 2/6671 297/216.14 |
| 7,823,971 | B2 * | 11/2010 | Humer | B60N 2/6673 297/216.12 |
| 9,789,790 | B2 * | 10/2017 | Kondrad | B60N 2/682 |
| 10,369,905 | B2 * | 8/2019 | Kondrad | B60N 2/20 |
| 2007/0296256 | A1 * | 12/2007 | Colja | B60N 2/66 297/284.4 |
| 2008/0185882 | A1 * | 8/2008 | Humer | B60N 2/6673 297/216.12 |
| 2009/0179471 | A1 * | 7/2009 | Humer | B60N 2/4228 297/216.12 |

(Continued)

FOREIGN PATENT DOCUMENTS

JP  2015-067172 A  4/2015

*Primary Examiner* — Shin H Kim
(74) *Attorney, Agent, or Firm* — Marshall-Melhorn, LLC

(57) ABSTRACT

A mat attachment structure of a seatback includes: a guide wire attached to the mat and provided with a width-direction extending part extending in s width direction of the seatback frame on a tip or root side of the seatback frame; and a holder having a base part which holds the width-direction extending part so as to be rotatable around an axis of the width-direction extending part and an attachment part attached to the seatback frame. When a force exceeding a predetermined value in a direction to separate from the seatback frame is applied from the width-direction extending part to the holder, the force being due to the force from the back of the occupant that the mat receives, the width-direction extending part departs from the base part or the holder departs from the seatback frame, so that the width-direction extending part is separated from the seatback frame.

6 Claims, 5 Drawing Sheets

(56) References Cited

U.S. PATENT DOCUMENTS

| | | | | |
|---|---|---|---|---|
| 2012/0292961 A1* | 11/2012 | Nitsuma | ............ | B60N 2/42781 297/216.14 |
| 2014/0125102 A1* | 5/2014 | McMillen | ................ | B60N 2/02 297/284.4 |
| 2016/0121761 A1* | 5/2016 | Nishide | .................... | B60N 2/22 297/284.3 |

* cited by examiner

MAT ATTACHMENT STRUCTURE OF SEATBACK AND VEHICLE SEAT

CROSS-REFERENCE TO RELATED APPLICATIONS

The present application is based on Japanese Patent Application No. 2018-029568, filed on Feb. 22, 2018, the entire contents of which are incorporated herein by reference.

TECHNICAL FIELD

The present application relates to a mat attachment structure of a seatback and a vehicle seat.

BACKGROUND

As for an interior structure of a seatback in a vehicle seat, a structure for attaching a mat for supporting a seating occupant's back to a seatback frame through a guide wire is described in JP 2015-067172 A.

In detail, the guide wire includes a pair of vertical wire parts extending substantially vertically and juxtaposed left and right and a horizontal wire part which connects respective lower parts of the pair of vertical wire parts in the horizontal direction.

Then, the horizontal wire part is pivotally supported to a lower frame, while the pair of vertical wire parts are inserted, with their upper straight portions in the form of straights rods, into insertion holes formed in an upper frame of the seatback frame so as to be movable vertically.

SUMMARY

The conventional seatback for vehicle seat is constructed so that a mat is moved from a natural position rearward by a force applied from a seating occupant's back and the mat is returned to the natural position by an occupant's unseating action.

The forward-and-rearward movement of the mat is allowed since the vertical wire parts of the guide wire moves up and down in the insertion holes of the upper frame, and the horizontal wire part is supported so as to be pivotable to the lower frame (pivot: rotation around its support part).

However, if the seatback is strongly pressed rearward by an occupant's back due to a vehicle collision or the like, only the horizontal wire part of the guide wire is permitted to move rearward within the range of rotation while the mat is to be moved greatly rearward against the seatback frame. That is, no great rearward movement is permitted to the mat.

Therefore, there is a possibility that a large reaction force is applied from the lower part of the mat to the vicinity of a seating occupant's lumbar portion because the rearward movement of the mat is restricted, and there is room for improvement.

In consideration of the above problem, an object of the present application is to provide a mat attachment structure of a seatback and a vehicle seat where there is no possibility that a large reaction force is applied from the mat side to an occupant even if the seatback is strongly pressed rearward by an occupant's back.

According to an embodiment, there is provided a mat attachment structure of a seatback for attaching a mat to a seatback frame, the mat configured to receive a force from a back of an occupant leaning against the seatback, the mat attachment structure including: a guide wire attached to the mat, the guide wire provided with a width-direction extending part which extends in a width direction of the seatback frame on a tip side of the seatback frame or a root side thereof; and a holder having a base part which holds the width-direction extending part so as to be rotatable around an axis of the width-direction extending part and an attachment part attached to the seatback frame. When an external force exceeding a predetermined value in a direction to separate the holder from the seatback frame, which is derived from the force from the back of the occupant that the mat receives, is applied from the width-direction extending part to the holder, the width-direction extending part departs from the base part or the holder departs from the seatback frame, whereby the width-direction extending part is separated from the seatback frame.

In the mat attachment structure according to the embodiment, the attachment part may be attached to the seatback frame by snap fitting.

In the mat attachment structure according to the embodiment, the holder may be configured so that when the external force exceeding the predetermined value is applied to the holder, the base part or the attachment part is broken, whereby the width-direction extending part is separated from the seatback frame.

According to an embodiment, there is provided a vehicle seat including: a seat cushion; a seatback pivotally; a seatback frame arranged inside the seat back; and a mat configured to receive a force from a back of an occupant leaning against the seatback. The mat is attached to the seatback frame by a mat attachment structure including: a guide wire attached to the mat and also provided with a width-direction extending part which extends in the width direction of the seatback frame on a tip side of the seatback frame or a root side thereof; and a holder having a base part which holds the width-direction extending part so as to be rotatable around an axis of the width-direction extending part and an attachment part attached to the seatback frame. When an external force exceeding a predetermined value in a direction to separate the holder from the seatback frame, which is derived from the force from the back of the occupant that the mat receives, is applied from the width-direction extending part to the holder, the width-direction extending part departs from the base part or the holder departs from the seatback frame, whereby the width-direction extending part is separated from the seatback frame.

In the vehicle seat of the embodiment, the attachment part may be attached to the seatback frame by snap fitting.

In the vehicle seat of the embodiment, the holder may be configured so that when the external force exceeding the predetermined value is applied to the holder, the base part or the attachment part is broken, whereby the width-direction extending part is separated from the seatback frame.

With the mat attachment structure of the seatback and the vehicle seat according to the embodiment, even when the seatback is strongly pressed rearward by the occupant's back, there is no possibility that a large reaction force is applied from the mat side to the occupant.

DETAILED DESCRIPTION

A frame structure of a vehicle seat ST provided with a mat attachment structure TK of a seatback according to an embodiment will be described with reference to FIG. 1.

Figure 1:
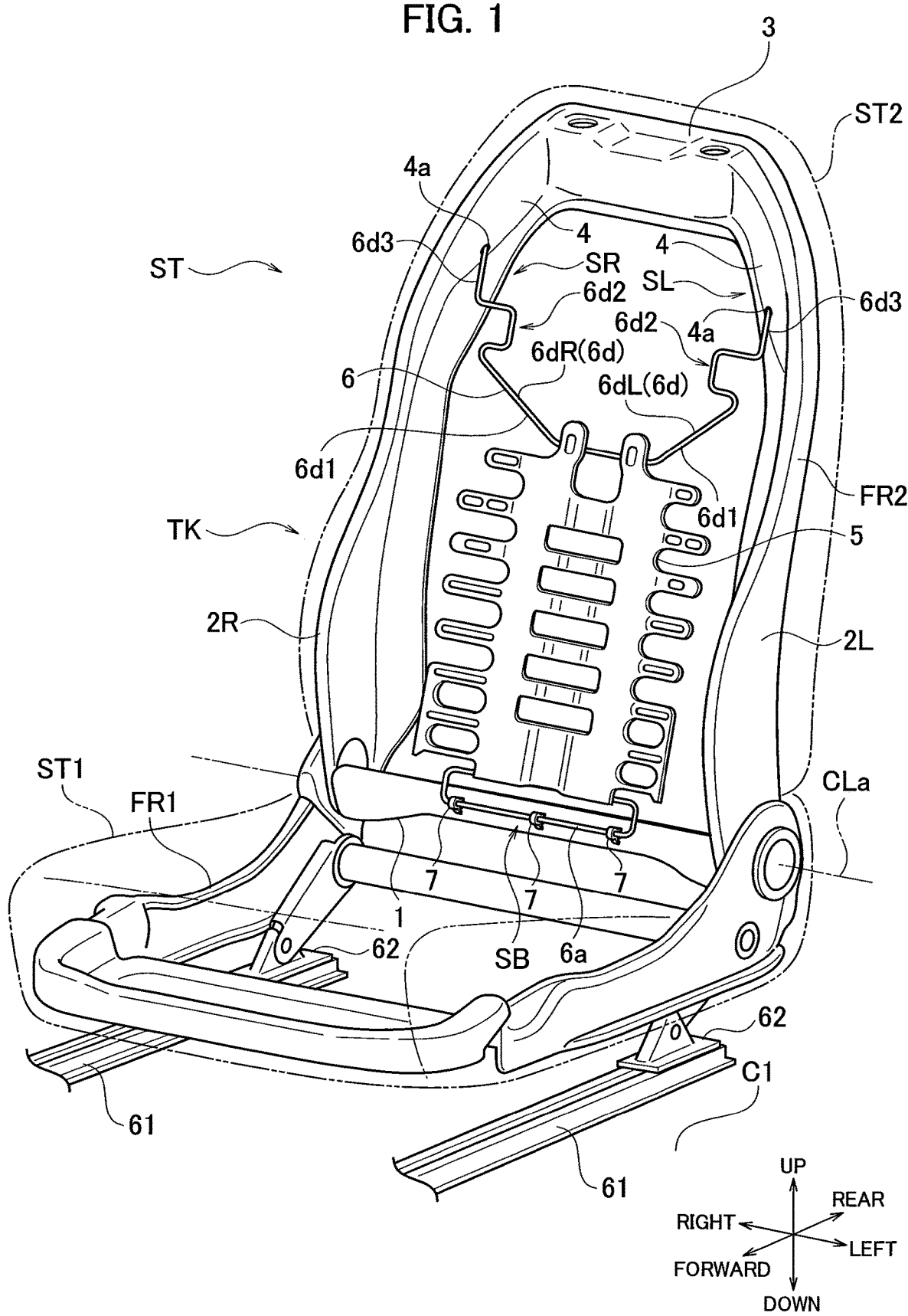
FIG. 1 is a perspective view explaining a frame structure of a vehicle seat according to an embodiment.

FIG. 1 is a perspective view for explaining a frame structure of a vehicle seat ST (it may be simply referred to as "seat ST" hereinafter). In the following description, respective directions of forward, rear, left, right, up, and down directions are defined by arrows illustrated in FIG. 1, based on a state where the seat ST is mounted on a vehicle. The left-and-right direction may be also referred to as "width direction".

As illustrated in FIG. 1, the seat ST includes a seat cushion ST1 where a seat cushion frame FR1 is covered with a cushion member, and a seatback ST2 where a seatback frame FR2 is covered with a cushion member.

A pair of movable rails 62 are attached to a bottom part of the seat cushion frame FR1. The pair of movable rails 62 are supported on a pair of fixed rails 61 as fixed members installed on a vehicle floor C1 of the vehicle so as to be movable in the forward-and-rearward direction. Thus, the seat ST is constructed so as to be slidable to the pair of fixed rails 61 rearward and forward.

At the rear part of the seat cushion frame FR1, the seatback frame FR2 disposed inside the seat ST is supported so as to be rotatable around a rotation axis CLa extending left and right.

The seatback frame FR2 is a so-called "panel frame" in the form of a frame made from a panel, and a direction connecting a root side of the panel frame and its tip side is defined as a longitudinal direction of the panel frame.

Specifically, the seatback frame FR2 includes a lower panel part 1 that extends in the left-and-right direction in the lower part of the seat frame FR2, a left side panel part 2L and a right side panel part 2R both of which stand up from the left and right ends of the lower panel part 1 in the longitudinal direction (i.e. substantially upward-and-downward direction in FIG. 1), and an upper panel part 3 that connects respective leading end portions of the left side panel part 2L and the right side panel part 2R in the left-and-right direction (i.e. width direction).

The upper panel part 3 includes a pair of shoulder portions 4 which are connected to the left side panel part 2L and the right side panel part 2R respectively, at a slant. Each of the shoulder portions 4 is formed with a through-hole 4a (see also FIG. 2).

In the central space surrounded by a frame of the seatback frame FR2, there are arranged a guide wire 6 supported by the seatback frame FR2 and a mat 5 in the form of a thin plate, which is attached to the guide wire 6.

The guide wire 6 is held by the seatback frame FR2 at two supporting parts SL, SR, which are arranged in an upper part of the seatback frame FR2 at left and right positions corresponding to the pair of through-holes 4a, and one supporting part SB in the bottom part of the frame FR2.

Next, the mat 5 and the guide wire 6 will be described with reference to also FIG. 2 and FIG. 3.

Figure 2:
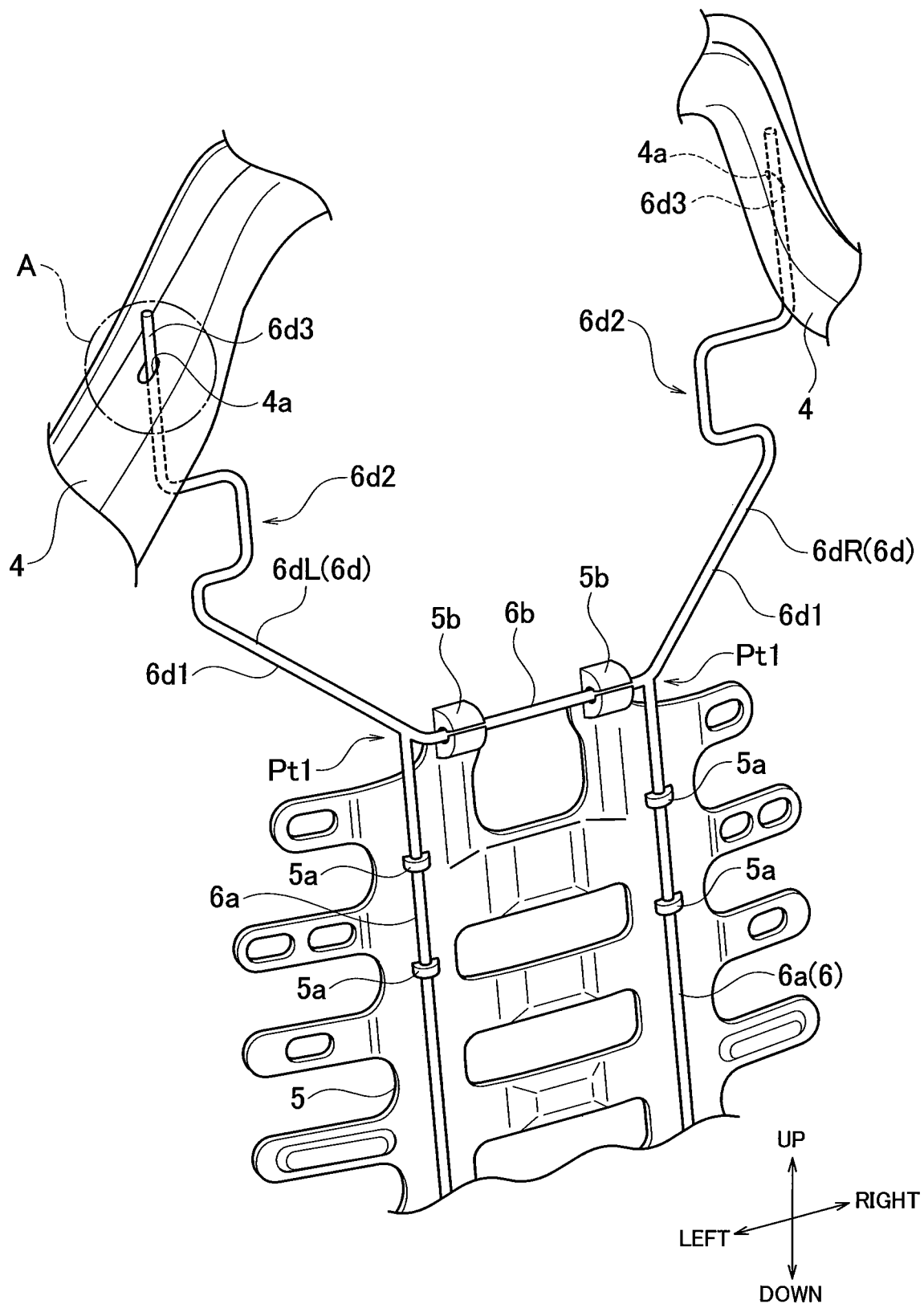
FIG. 2 is a partial perspective view explaining an upper structure of a guide wire and a mat of the vehicle seat according to the embodiment.
Figure 3:
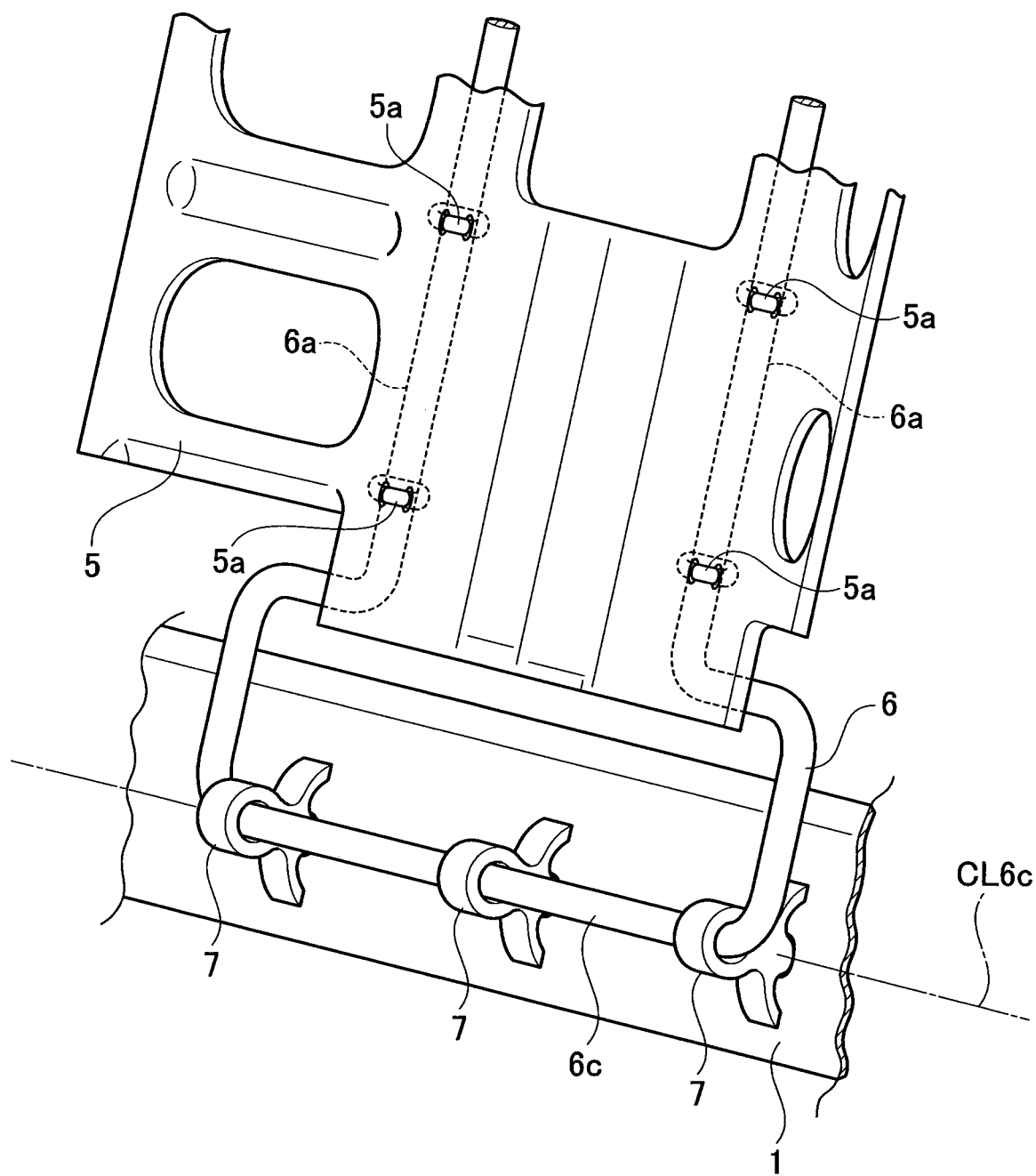
FIG. 3 is a partial perspective view explaining an lower structure of the guide wire and the mat of the vehicle seat according to the embodiment.

FIG. 2 is a partial perspective view of the upper part of the mat 5 as viewed from the rear left and slightly above, while FIG. 3 is a partial perspective view of the lower portion of the mat 5 as viewed from the rear right and slightly above.

The guide wire 6 is made from a wire-like spring material. On the surface of the guide wire 6, there is formed a lubricant layer for improving the sliding performance of the guide wire with the other member.

The guide wire 6 includes a pair of vertical wire parts 6a disposed on the rear surface side of the mat 5 to extend up and down and also separated from each other, an upper connecting part 6b connecting respective upper portions of the pair of vertical wire parts 6a, and a lower connecting part 6c connecting respective lower portions of the vertical wire parts 6a. The upper connecting part 6b and the lower connecting part 6c are also referred to as "width-direction extending parts".

The guide wire 6 further includes a pair of arm parts 6d extending from connecting parts Pt1 where the upper connecting part 6b and the vertical wire parts 6a are connected, obliquely to the upper left and the upper right. Hereinafter, the arm part 6d on the left side is referred to as "left arm part 6dL", while the arm part 6d on the right side is referred to as "right arm part 6dR".

The mat 5 is attached to the pair of vertical wire parts 6a and the upper connecting part 6b through a plurality of fasteners 5a, 5b in a manner that the pair of vertical wire parts 6a and the upper connecting part 6b are deformed together by an external force without being separated from each other.

The lower connecting part 6c is shaped straightly. The lower connecting part 6c is attached to the lower panel part 1 by a plurality of holders 7 (three holders in the embodiment) so as to be rotatable around an axis CL6c of the lower connecting part 6c extending in the left-and-right direction.

The holders 7 are made of resin, for example. Each holder 7 is attached to the lower panel part 1 by a snap fit structure.

Figure 4:
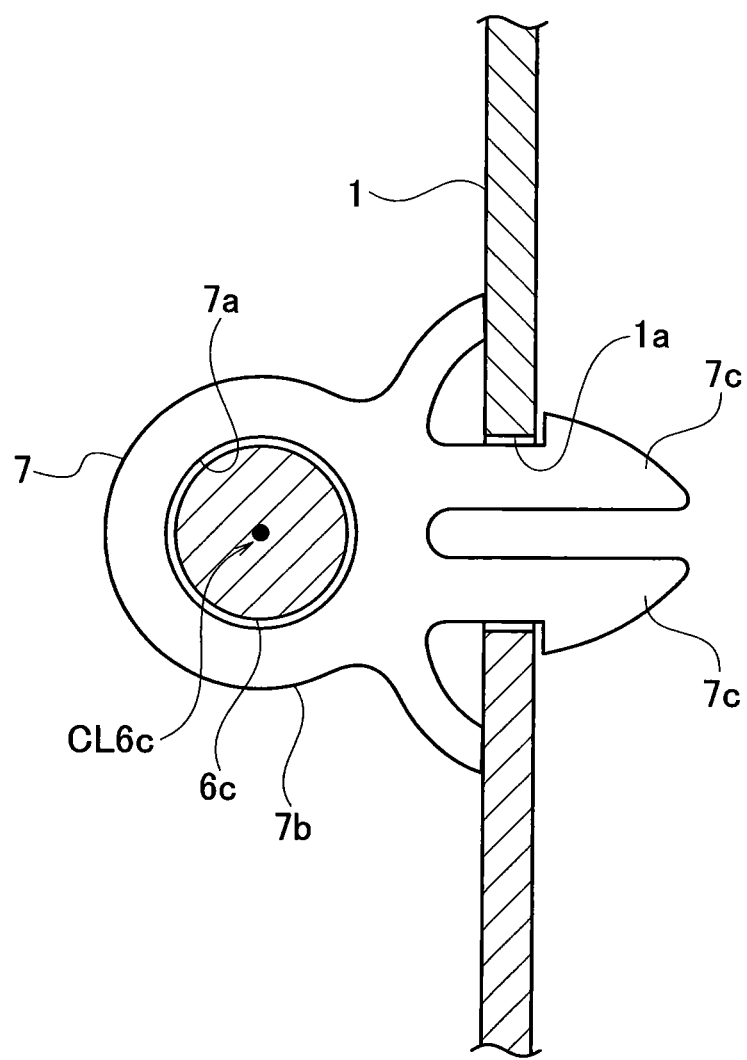
FIG. 4 is a sectional view explaining a holder for fixing the guide wire to a lower panel part.

The attaching state of the holder 7 is illustrated in a sectional view of FIG. 4.

As illustrated in FIG. 4, the holder 7 includes a base part 7b having an insertion hole 7a and a pair of engagement legs 7c protruding from the base part 7b.

The lower connecting part 6c is inserted into the insertion hole 7a so as to be rotatable around the axis CL6c. The holder 7 is attached to the lower panel part 1 by snap fitting where the pair of engagement legs 7c are inserted in and engaged with an engagement hole 1a formed in the lower panel part 1, with elastic deformation. Therefore, the engagement legs 7c serve as attachment parts for attaching the holder 7 to the lower panel part 1.

The left arm part 6dL and the right arm part 6dR are formed symmetric laterally. Hereinafter, the right arm part 6dR will be described as a representative, and reference numerals indicating various portions are respectively common in the left and right arm parts.

The right arm part 6dR includes an inclined extended portion 6d1 extending obliquely upward from the connecting part Pt1 where the upper connecting part 6b and the vertical wire part 6a are connected, a bent portion bent 6d2 in the left-and-right direction to improve torsion and bending elasticity of the right arm part 6dR and a straight portion 6d3 extending straight upward from the bent portion 6d2.

The straight portion 6d3 is inserted into the through-hole 4a of the shoulder part 4 from downward to upward so as to be movable up and down.

Accordingly, in a lower section of the mat 5 and the guide wire 6, the lower connecting part 6c of the guide wire 6 is supported by the lower panel part 1 through the holders 7 so as to be rotatable around the axis CL6c. On the other hand, in an upper section of the mat 5 the guide wire 6, it is supported by the shoulder part 4 while the straight portions 6d3 are being inserted into the through-holes 4a. In this way, the mat 5 and the guide wire 6 are attached to the seatback frame FR2 so as to be movable forward and rearward elastically.

Figure 5:
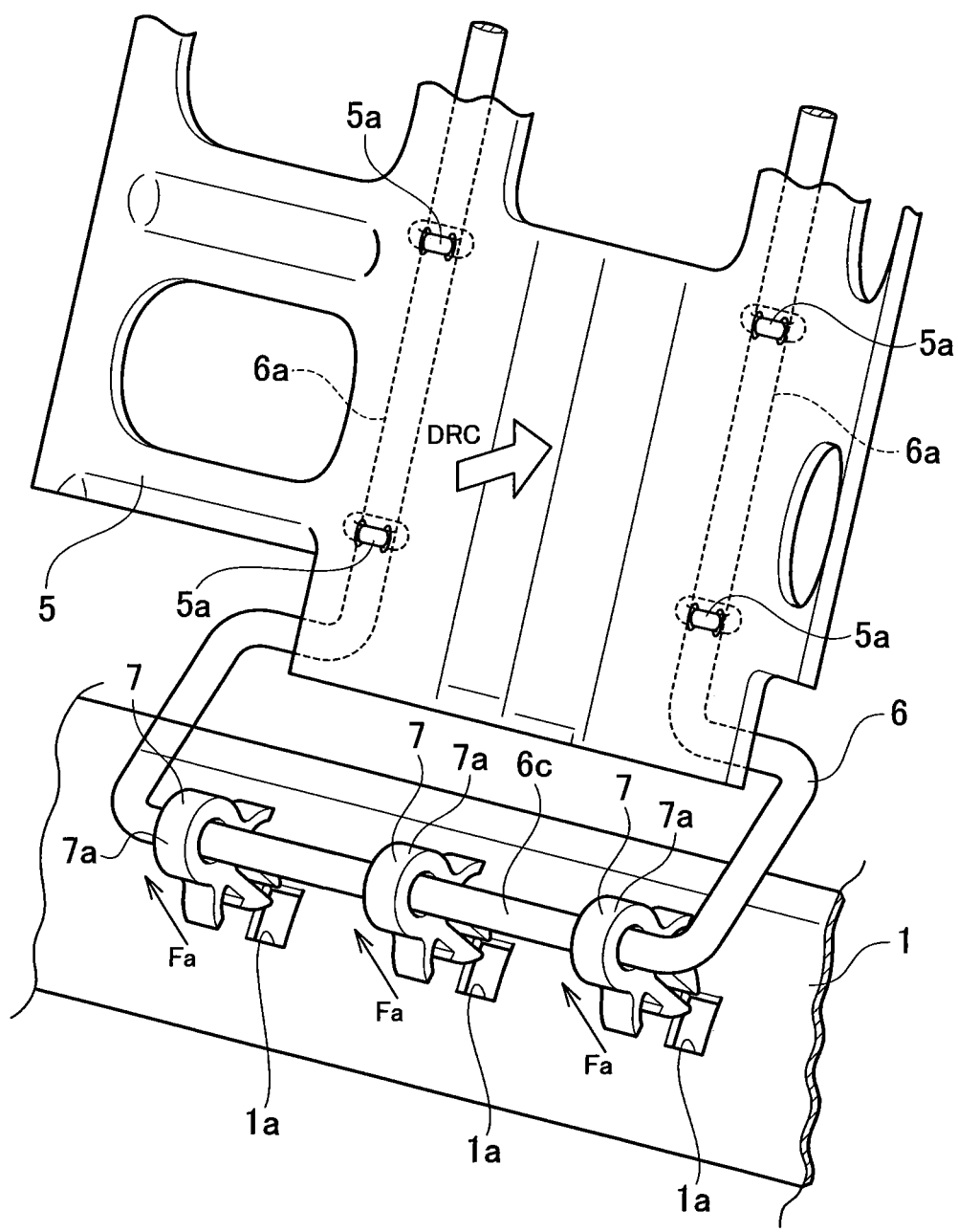
FIG. 5 is a partial perspective view explaining detachment of the holders when a large rearward force is applied to the mat.

In the above-described configuration, when the force applied to the holder 7 by the rearward movement of the mat 5 is larger than a preset value, the lower connecting part 6c is separated from the lower panel part 1, as illustrated in FIG. 5.

This separation can be derived from either of a state where the engagement leg 7c of the holder 7 is elastically deformed, so that the engagement with the engagement hole 1a is released (which is referred to as "disengagement separation" hereinafter) and another state where the engagement leg 7c or the base part 7b of the holder 7 is destroyed (which is referred to as "destruction separation").

FIG. 5 illustrates a state where the lower connecting parts 6c are disengaged and separated from the lower panel part 1 (disengagement separation).

When the back of an occupant seating on the seat ST pushes the seatback ST2 rearward, the mat 5 receiving a force from the occupant's back moves rearward (as illustrated with an arrow DRc in FIG. 5). Consequently, the base part 7b of each holder 7 is applied with a force Fa (as an external force derived from the force that the mat receives from the occupant's back) in a direction to disengage the engagement leg 7c from the engagement hole 1a through the lower connecting part 6c of the guide wire 6.

In particular, when a vehicle (on the side of an occupant) encounters a rear-end collision, the external force Fa get extremely larger than that during normal seating since the occupant's back causes the seatback ST2 to be moved rearward with impact.

When it is going to execute the separation of the lower connecting part 6c from the lower panel part 1 with a large Fa by the elastic deformation separation of the holders 7, each holder 7 is previously established and formed so that when the external force Fa exceeds a predetermined value, the engagement leg 7c is elastically deformed and detached from the engagement hole 1a (the lower panel part 1), whereby the lower connecting part 6c together with the base part 7b is separated from the lower panel part 1.

On the other hand, when it is going to execute the separation by the destruction separation of the holders 7, each holder 7 is previously established and formed so that when the external force Fa exceeds a predetermined value, the base part 7b is broken, whereby the lower connecting part 6c is detached from the base part 7b and thus separated from the lower panel part 1. Alternatively, each holder 7 is previously established and formed so that when the force Fa exceeds a predetermined value, the engagement leg 7c is broken, whereby the lower connecting part 6c together with the base part 7b is separated from the lower panel part 1.

Consequently, according to the mat attachment structure TK and the vehicle seat ST including the mat attachment structure TK, when the seatback ST2 is strongly pushed rearward by the back of a seating occupant due to a rear-end collision of the vehicle, the lower connecting part 6c of the guide wire 6 is separated without being restrained by the lower panel part 1, thereby allowing large rearward movement of the mat 5.

Therefore, unlike the conventional structure where large rearward movement of the mat 5 is restricted, there is no possibility that a large reaction force is applied from the mat side to a seating occupant.

The present invention is not limited to the embodiment described above, and various modifications can be made without departing from the scope of the present invention.

In the mat mounting structure TK according to the embodiment, the upper part of the guide wire 6 is inserted into and supported by the through hole 4a with the straight part 6d3, and the lower connecting part 6c is formed at the lower part and supported by the holder 7 on the frame side. However, it may be upside down.

That is, the upper portion of the guide wire may be supported on the frame side by the holder 7 and the lower portion may be configured to be inserted and supported in the through hole on the frame side with a straight portion.

The structure for attaching the holder 7 to the lower panel portion 1 is not limited to the snap fit structure described above. A fastening structure using screws or a fastening structure using fastener bands may be used.

What is claimed is:

1. A mat attachment structure of a seatback for attaching a mat to a seatback frame, the mat configured to receive a force from a back of an occupant leaning against the seatback, the mat attachment structure comprising:
   a guide wire attached to the mat, the guide wire provided with a width-direction extending part which extends in a width direction of the seatback frame on a tip side of the seatback frame or a root side thereof; and
   a holder having a base part which holds the width-direction extending part so as to be rotatable around an axis of the width-direction extending part and an attachment part attached to the seatback frame, wherein
   when an external force exceeding a predetermined value in a direction to separate the holder from the seatback frame, which is derived from the force from the back of the occupant that the mat receives, is applied from the width-direction extending part to the holder, the width-direction extending part departs from the base part or the holder departs from the seatback frame, whereby the width-direction extending part is separated from the seatback frame.

2. The mat attachment structure of claim 1, wherein the attachment part is attached to the seatback frame by snap fitting.

3. The mat attachment structure of claim 1, wherein the holder is configured so that when the external force exceeding the predetermined value is applied to the holder, the base part or the attachment part is broken, whereby the width-direction extending part is separated from the seatback frame.

4. A vehicle seat, comprising:
   a seat cushion;
   a seatback;
   a seatback frame arranged inside the seat back; and
   a mat configured to receive a force from a back of an occupant leaning against the seatback, wherein
   the mat is attached to the seatback frame by a mat attachment structure comprising:
   a guide wire attached to the mat, the guide wire provided with a width-direction extending part which extends in a width direction of the seatback frame on a tip side of the seatback frame or a root side thereof; and
   a holder having a base part which holds the width-direction extending part so as to be rotatable around an axis of the width-direction extending part and an attachment part attached to the seatback frame wherein when an external force exceeding a predetermined value in a direction to separate the holder from the seatback frame, which is derived from the force from the back of the occupant that the mat receives, is applied from the width-direction extending part to the holder, the width-direction extending part departs from the base part or the holder departs from the seatback frame, whereby the width-direction extending part is separated from the seatback frame.

5. The vehicle seat of claim 4, wherein the attachment part is attached to the seatback frame by snap fitting.

6. The vehicle seat of claim 4, wherein the holder is configured so that when the external force exceeding the predetermined value is applied to the holder, the base part or the attachment part is broken, whereby the width-direction extending part is separated from the seatback frame.

\* \* \* \* \*

UNITED STATES PATENT AND TRADEMARK OFFICE
CERTIFICATE OF CORRECTION

PATENT NO. : 10,857,921 B1
APPLICATION NO. : 16/539166
DATED : December 8, 2020
INVENTOR(S) : Toshimitsu Mizukoshi et al.

It is certified that error appears in the above-identified patent and that said Letters Patent is hereby corrected as shown below:

On the Title Page

Correct the Assignee section as follows:
Assignees:
Adient Engineering and IP GmbH, Burscheid (DE); Honda Motor Co., Ltd., Tokyo (JP)

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*